Sept. 20, 1955   G. HENRY ET AL   2,718,096
APPARATUS FOR MELTING GLASS AND THE LIKE
Original Filed July 17, 1947
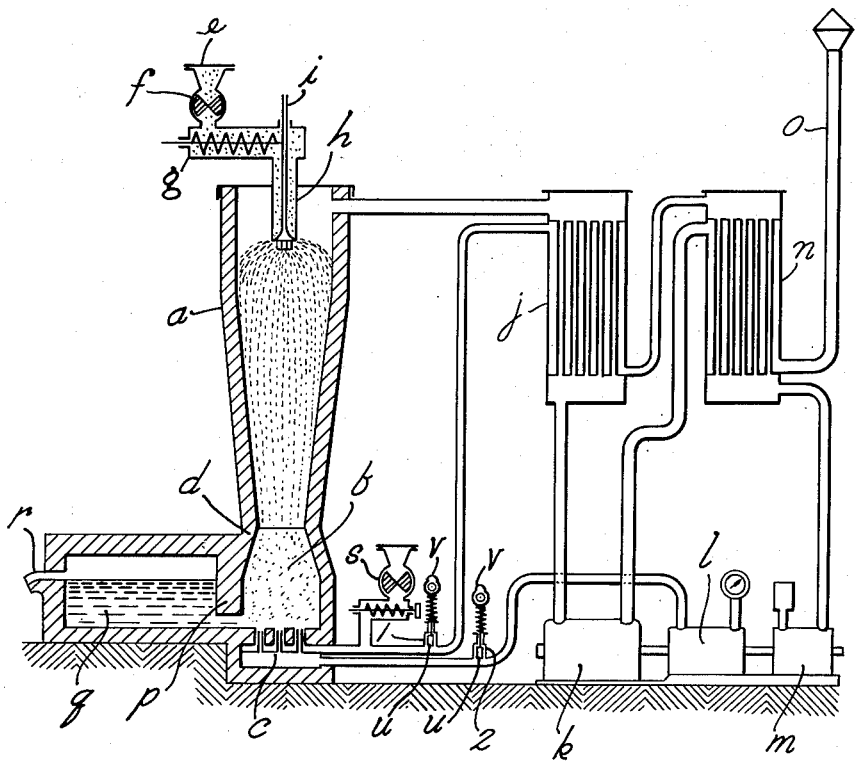
INVENTORS
Georges Henry
Edgard Brichard
By Robert E. Burns
ATTORNEY

United States Patent Office 2,718,096
Patented Sept. 20, 1955

2,718,096

APPARATUS FOR MELTING GLASS AND THE LIKE

Georges Henry, Dampremy, and Edgard Brichard, Jumet-Houbois, Belgium, assignors of one-third to Union des Verreries Mecaniques Belges, Charleroi, Belgium, a Belgian company Original application July 17, 1947, Serial No. 761,632, now Patent No. 2,634,555, dated April 14, 1953. Divided and this application October 31, 1952, Serial No. 320,581

4 Claims. (Cl. 49—54)

The present invention relates to an apparatus for the manufacture of glass and like products and it has for its object to improve the thermal efficiency of the fusion of these materials. As like products are to be understood herein, enamels, silicates, basalts and generally products which at high temperature give rise to the phenomenon of so-called pasty fusion. This application is a division of our copending application, Serial No. 761,632, filed July 17, 1947 (now U. S. Patent 2,634,555, dated April 14, 1953).

An object of the invention is to provide a furnace or oven for carrying out the process described and claimed in our said Patent No. 2,634,555, in which the heat necessary for melting the raw materials and heating them to the required temperature is supplied by blowing flames under high pressure and at a high rate of flow through the bath.

In ovens at present used in the manufacture of glass, the heating gases circulate under a pressure very near atmospheric, differing from the latter only by a few millimeters more or less of water column. The rate of flow, calculated at normal pressure and temperature, is normally of about 3 meters per second; it can exceptionally reach 8 m./s. Higher rates of flow can be adopted without inconvenience, as if the flame is introduced under high pressure and at high speed into a free enclosure, it heats the walls to such high temperature that it brings about a speedy destruction thereof.

It follows that in the usual melting ovens, the cross sectional area of the inlet and outlet flues must be very large in order to provide the necessary delivery. The heat exchange surfaces, both in the oven itself and in the apparatus for recuperating waste heat, must also be very extensive in view of the low transmission coefficients corresponding to operating conditions. Moreover the volume and the weight of the main apparatus and of the accessories to the oven, and the surfaces exposed to external losses are very great.

It results therefrom that the thermal efficiency of the fusion is very low, namely of the order of 20%. This type of apparatus is difficult to operate on account of its size and the large masses which are involved. Its construction and upkeep is costly.

It has been proposed to melt glass by blowing air and gas into the mass, but processes of this kind have not been developed, as with the usual flow rates and pressures on ordinary furnaces, results are mediocre. It is seen that under these conditions the flame overheats the walls near the blowing nozzles and causes their speedy destruction at the same time as the destruction of the nozzles themselves. Heat losses are important and the operation of the blowers is unsatisfactory: the melted mass tends to surge back towards the orifices which it partly obstructs before it is again violently projected outwards, the combustion thus being irregular.

The apparatus according to the present invention comprises a shaft communicating at its bottom with a melting pot, the shaft having a constriction above the melting pot, air and gas nozzles opening into the bottom of the pot for supplying air and gas thereto, means at the top of the shaft for supplying powdered raw materials and for delivering these materials spray-fashion over the entire cross-sectional area of the shaft, and an outlet above the delivering means for evacuating the burned gases from the shaft.

In operating the apparatus the fuel and air previously raised to a pressure that is at least of 2000 mm. of water column i. e. about 20% above atmospheric pressure and may reach several atmospheres, are blown directly into the molten mass at a rate that is at least of 30 meters per second (at normal temperature and pressure) and may reach several hundreds of meters per second. Under these conditions the flux of heat is well concentrated into a reduced zone whereby apparatus of small size may be used. Under influence of high pressure and high rate of speed, the heat transmission coefficients are considerably increased.

This effect is marked in the melting oven itself as well as in the heat recuperation apparatus wherein, with this process, it is possible to circulate, at high pressure and high rate of speed, both the burnt gases and the gases to be preheated.

In this apparatus, the drawbacks which were due to the lack of uniformity of combustion and to the destruction of the walls no longer exist. It is found, in fact, that when gases are blown at a rate of speed above 30 meters per second into a mass of molten glass, the maximum temperature no longer builds up in proximity to the nozzles, but at a certain distance of the point of injection, that is well within the molten mass. The nozzles and the adjacent walls are thus protected against overheating and an excellent use of the available heat is obtained, the flame being completely surrounded with molten products which offer thereto the largest possible exchange surface.

Furthermore, owing to the high speed of the flames, the molten mass is brought to a state of extreme turbulence. The surfaces offered to the action of the flames are continuously renewed, whereby the heat transmission is still materially improved. The stirring of the bath is also favorable to the homogeneity of the finished product.

The pressure of the gases also results in increasing the rate of combustion so that the combustion can be quickly completed and the fumes can yield to the bath the whole of their useful sensible heat before they escape; this being all the more so since, by reason of the high rate of combustion, the temperature of the flame is very high and near the theoretical combustion temperature.

On the other hand the fusion under high pressure is of such nature as to give rise, by expansion of the gases contained in the glass, to an increase in the number and the size of occluded bubbles. It is known that the presence of a large number of big bubbles travelling through the bath is favorable to the refining of the glass. The result is bubbly glass which may be used as such for some special purposes, or may be refined in a separate oven or in a rest zone suitably provided in the melting furnace itself.

The pressure and rate of speed of the flames, combined with the efficacy of the heat transmission in the turbulent mass make it possible to develop within a restricted space a very large quantity of heat. In comparison with the usual construction, the heat transmission per square meter of free surface of the bath is raised from 40 kgcal./m.$^2$/sec. to more than 600 kgcal./m.$^2$/sec. Consequently the size of the apparatus may be reduced in a proportion of about 1 to 10, the heat losses through the walls thus becoming very low.

In operating the apparatus the chemical nature and the physical aspect of the finishing product may be modified by giving to the injected mixture a determined chemical composition. For example in glasses containing bodies which, according to their degree of oxidation, modify the color of the glass, the coloring may be varied by using a more or less oxiding or a more or less reducing flame. Thus, in the case of iron-containing glass, if the ratio of gas delivery to air delivery is increased, a reducing flame is obtained which will modify the color towards blue, whereas if the gas/air ratio is decreased, an oxidizing flame is obtained that will give the glass a lighter greenish hue. We may also add to the comburent or to the fuel, reagents such, for instance, as gaseous coloring substances or colored substances dispersed as a fine dust so that they may be held in suspension in the fuel or in the comburent.

For example with the use of non-desulfurized coke-oven gas as fuel, the operation carried out in reducing atmosphere will give glass of yellow color due to sulfides.

The fumes escaping from the bath may advantageously be kept under relatively high pressure and may travel at high speed in order to promote the heat exchange with the fresh raw material and/or with the fuel and the combustion air, or for recuperating their heat for any other purpose. By causing the fumes to expand in a suitable mechanical device all or part of the energy used in compressing the heating gases may be recovered.

In order to preheat the raw materials in a divided state, it is advantageous to drop these spray-fashion onto the molten mass, so that they fall in contra-current through the ascending combustion gases issuing from the mass.

Into the layer or mass of molten glass in the melting pot are blown the elements necessary to combustion, or the greater part of these elements at suitable spots and in suitable directions. The gaseous elements having previously been compressed and if desired heated, their mixture is ignited and yields a part of its heat to the molten mass.

After having passed through the molten mass, the gaseous combustion products travel upwardly through the vertical shaft and pass through the fresh raw materials which are continuously introduced at the top and drop freely in the shaft. These materials are preferably in the solid state and in a more or less finely divided condition, and they are uniformly distributed over all the cross-section of the shaft by a dispersion apparatus.

The degree of division of the raw materials and their specific weight on the one hand, the upward rate of flow of the fumes on the other hand determine the rate of fall of the particles and the duration of their contact with the fumes before they reach the surface of the bath. Preferably conditions will be such that the preheated raw materials will reach the bath at a temperature near the temperature of the burned gases escaping therefrom.

The vertical shaft forming the upper portion of the oven may have a varying cross section at different levels so as to vary the upward speed of the fumes and, in correlation therewith, the downward speed of the raw materials. Thus we found an advantage in constricting the cross section towards the bottom of the shaft and on the contrary, in enlarging it towards the fumes' outlet.

The molten glass is withdrawn from the melting pot through an opening normally immersed in the bath. It may be desirable to reserve in the pot a zone where the finished glass escapes the turbulence of the flame, so that it can be subjected to some extent to refining. This zone of rest may be formed by an extension of the pot extending laterally or towards the bottom of the active portion.

The glass withdrawn may be used immediately for shaping operations, or it may be subjected to a supplementary refining operation in a furnace of any known or suitable type operating in combination with the melting oven.

The outlet for the combustion products from the vertical shaft forming the upper portion of the furnace may be connected to one or more heat exchangers for preheating the fuel gas and/or the combustion air, and such heat exchangers may be combined with a mechanical device such as a gas turbine, driven by the partially cooled expanding combustion products in order to supply all or part of the energy necessary for compressing the fuel gas and/or the combustion air.

The accompanying drawing, diagrammatically illustrates by way of example an apparatus constructed in accordance with the present invention.

$a$ is a shaft furnace at the bottom of which is a melting pot $b$ containing the molten glass through which pass flame jets. The gases are blown at high speed and pressure through nozzles $c$ comprising two concentric pipes, one for the combustion air, the other for the fuel.

After having yielded a part of the heat to the molten bath, the fumes travel in contra-current to and heat the raw materials falling as a spray in the shaft $a$.

In the lower part of the furnace is a constriction $d$ which has a double function. On the one hand it reduces the radiation losses from the surface of the molten bath, on the other hand it increases the rate of flow of the fumes, so that the falling materials remain in suspension above the constriction $d$.

By momentarily decreasing the supply of the gases, a certain amount of raw materials are caused to drop onto the surface of the bath. Periodic variations in the supply of gases may be produced by providing in the inlet pipes of the furnace mechanically operated valves 1 and 2 adapted to throttle, at predetermined intervals of time, the cross sectional area of the pipes. The valves 1 and 2 shown in the drawing are controlled by a cam $v$ and have a valve member $u$. By this means, the duration of the contact of the raw material with the fumes, before their introduction into the bath, may be regulated at will.

The raw materials are charged into a hopper $e$ provided with a rotating feeder $f$ which permits of admitting them into the furnace in spite of the higher pressure therein. A worm $g$ carries the materials into the central feeding tube $h$. As they leave this tube the materials are dispersed spray-fashion by a jet of air pressure blown from the tube $i$.

Above the constriction $d$ the shaft flares upwardly, so that the rate of flow of the fumes decreases as they rise, and opposite the fumes' outlet it is so low that no part of the raw materials is carried towards the recuperators.

As they come out of the shaft, the fumes enter a recuperator $j$ in which their pressure and rate of flow are still sufficiently great to ensure an efficient heat exchange with the combustion air. They are then expanded in a gas turbine $k$ which drives the air blower $m$ and gas blower $l$. On leaving the gas turbine the fumes pass through a second recuperator $n$ and then are let out to the atmosphere through $o$.

The combustion air compressed by the turbo-blower $m$ successively passes through the recuperators $n$ and $j$, and arrives at high temperature in the air chamber for the nozzles $c$. A distributor with fluid-tight feeding chamber $s$ permits of introducing into the air pipe reagents in the form of very fine powder.

The fuel gas compressed by the turbo-blower $l$ is sent to the gas chamber for the nozzles $c$.

The glass melted in the furnace passes under a wall $p$ into a refining zone $q$ where occluded bubbles are allowed to escape; it is collected at $r$ or directed towards shaping or other apparatus.

In order to start the plant, the gas is first ignited at the nozzles $c$, without air pressure being introduced. The flame burns freely in contact with the air contained in the furnace. The necessary delivery of compressed air, then is gradually admitted. A certain quantity of broken up glass is then charged, which quickly melts, whereupon the feeding of composition through $h$ and its distribution by $i$ are started.

Although in the above description the production of glass has been more particularly dealt with, the apparatus according to this invention is also applicable to the fusion of like materials, such as those mentioned above.

We claim:

1. An apparatus for melting glass and the like comprising, in combination, a shaft communicating at its bottom with a melting pot, said shaft having a constriction above said melting pot, nozzles opening into the bottom of said pot for supplying air to said pot, and nozzles opening into the bottom of said pot for supplying gas thereto, each nozzle for supplying air adjoining a nozzle for supplying gas, whereby the gas and the air inter-mix immediately upon leaving the respective nozzles, means at the top of said shaft for supplying powdered raw materials into said shaft and for delivering said materials as a spray over substantially the entire cross-sectional are of the shaft, and an outlet above said last-named means for evacuating gases from said shaft.

2. An apparatus for melting glass and the like as defined in claim 1, wherein said shaft flares upwardly from the constriction toward said means for delivering raw materials.

3. An apparatus for melting glass and the like as defined in claim 1, further comprising a chamber communicating with the melting pot for receiving molten material from said melting pot and providing a refining zone for said last-named material.

4. An apparatus for melting glass and the like as defined in claim 1, further comprising means for regulating the pressure of air and gas passing through said nozzles.

References Cited in the file of this patent

UNITED STATES PATENTS

| | | |
|---|---|---|
| 351,413 | Wainwright | Oct. 26, 1886 |
| 2,131,599 | Shrum | Sept. 27, 1938 |

FOREIGN PATENTS

| | | |
|---|---|---|
| 651,687 | Germany | Oct. 18, 1937 |